(12) United States Patent
Stute et al.

(10) Patent No.: US 12,137,715 B2
(45) Date of Patent: Nov. 12, 2024

(54) FLOW CELL FOR THE TREATMENT OF LIQUIDS

(71) Applicant: DEUTSCHES INSTITUT FÜR LEBENSMITTELTECHNIK E.V., Quakenbrück (DE)

(72) Inventors: Martin Stute, Quakenbrück (DE); Dimitri Reimer, Quakenbrück (DE)

(73) Assignee: DEUTSCHES INSTITUT FÜR LEBENSMITTELTECHNIK E.V., Quakenbrück (DE)

( * ) Notice: Subject to any disclaimer, the term of this patent is extended or adjusted under 35 U.S.C. 154(b) by 1123 days.

(21) Appl. No.: 16/968,027

(22) PCT Filed: Feb. 11, 2019

(86) PCT No.: PCT/EP2019/053348
§ 371 (c)(1),
(2) Date: Aug. 6, 2020

(87) PCT Pub. No.: WO2019/158491
PCT Pub. Date: Aug. 22, 2019

(65) Prior Publication Data
US 2021/0360950 A1  Nov. 25, 2021

(30) Foreign Application Priority Data
Feb. 15, 2018 (DE) .......................... 102018202369.7

(51) Int. Cl.
*A23L 5/30* (2016.01)
*A23L 3/32* (2006.01)
*B01J 19/08* (2006.01)

(52) U.S. Cl.
CPC ............... *A23L 3/32* (2013.01); *B01J 19/087* (2013.01); *B01J 2219/0809* (2013.01);
(Continued)

(58) Field of Classification Search
CPC ....................... A23L 3/32; B01J 19/087; B01J 2219/0809; B01J 2219/0826; B01J 2219/0837;
(Continued)

(56) References Cited

U.S. PATENT DOCUMENTS

| | | | |
|---|---|---|---|
| 6,093,432 A | 7/2000 | Mittal et al. | |
| 2001/0043638 A1* | 11/2001 | Wittle | F27B 3/085 175/11 |
| 2004/0238348 A1 | 12/2004 | Chatroux et al. | |
| 2009/0255222 A1* | 10/2009 | Cortez | H01J 37/32568 55/366 |
| 2019/0206661 A1* | 7/2019 | Mohanty | H01J 37/32449 |

FOREIGN PATENT DOCUMENTS

| | | |
|---|---|---|
| CA | 882293 | 9/1971 |
| DE | 69033273 | 12/1990 |

(Continued)

OTHER PUBLICATIONS

International Search Report and Written Opinion from the corresponding International Patent Application No. PCT/EP2019/053348, mailed May 21, 2019.
(Continued)

*Primary Examiner* — Xiuyu Tai
(74) *Attorney, Agent, or Firm* — Greer, Burns & Crain, Ltd.; Steven P. Fallon

(57) ABSTRACT

The invention relates to a flow cell having a tube piece which extends along a longitudinal axis and within which a first electrode is coaxially arranged. The tube piece is formed by a first tube section and by a second tube section and by a second electrode which is arranged between the first and the second tube sections and which is circumferentially closed, so that its inner surface forms a part of the tube piece.

14 Claims, 1 Drawing Sheet

Figure 2:
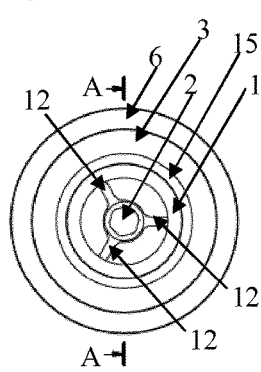

(52) U.S. Cl.
CPC ............... *B01J 2219/0826* (2013.01); *B01J 2219/0837* (2013.01); *B01J 2219/0841* (2013.01); *B01J 2219/0877* (2013.01)

(58) Field of Classification Search
CPC ........ B01J 2219/0841; B01J 2219/0877; B01J 19/08; B01J 19/088; B01J 2219/0813; B01J 2219/0815; B01J 2219/0875; B01J 2219/0828; B01J 2219/0884; B01J 2219/083; B01J 2219/0849; B01J 19/2425; B01J 19/243; A61L 2/03; A61L 9/22; A61L 2/14; A61L 2/00; A61L 9/00; A61L 9/16; H05H 1/2431; H05H 1/2418; H05H 1/00; H05H 1/2465; H05H 1/2439; H05H 2245/15; H05H 1/2443; H05H 1/2406; B01D 2259/818; B01D 2257/91; B01D 53/323; F24F 8/20; C02F 1/48; C02F 2201/003; C02F 2201/483; C02F 2303/04
See application file for complete search history.

(56) References Cited

FOREIGN PATENT DOCUMENTS

| | | |
|---|---|---|
| EP | 0553377 | 8/1993 |
| EP | 1198997 | 4/2002 |
| WO | 9015547 | 12/1990 |

OTHER PUBLICATIONS

Huang, et al., "Designs of pulsed electric fields treatment chambers for liquid foods pasteurization process: A review", Journal of Food Engineering, 2009, vol. 95, pp. 227-239.

Toepfl, Stefan, "Pulsed Electric Field food treatment—scale up from lab to industrial scale", SciVerse ScienceDirect, Procedia Food Science, 2011, vol. 1, pp. 776-779.

Written Opinion of the International Searching Authority on the corresponding International Patent Application No. PCT/EP2019/053348, issued Aug. 18, 2020.

* cited by examiner

B - B

C - C

FLOW CELL FOR THE TREATMENT OF LIQUIDS

The present invention relates to a flow cell by which liquids can be treated with an electrical field that is built up between two electrodes. The flow cell in particular is suited for use as a treatment device for liquids which are pumpable foods, and for a process for the treatment of liquids by electric fields. The electrodes are arranged so that between them an electrical field is formed radially in the flow cell.

The flow cell is characterized by a structure which allows for an easy assembly and disassembly, e.g. for cleaning its inner surfaces.

In an embodiment, the flow cell is provided in combination with at least one further electrode which has a different diameter than an electrode contained within the flow cell, or resp. as a combination of a flow cell with at least 2 electrodes, only one of which is installed in the tube section. In the combination, at least one electrode can be exchanged for a further electrode having a different diameter, e.g. in order to change and resp. adapt the distance between the electrodes e.g. upon a change of the liquid.

STATE OF THE ART

DE 690 33 273 T2 describes a flow cell in which the electric field is formed radially within a tube, wherein the tube forms the flow cell in which a second electrode is coaxially arranged and is axially slidable by being slidably guided at one end of the tube.

US 2004/0 238 348 A1 describes a flow cell in which a radially directed electric field can be generated between a tubular outer electrode and an inner electrode arranged coaxially therein. By means of a carrier, the inner electrode is attached to the inner wall of the tube that forms the flow cell.

EP 1 198 997 A2 shows a flow cell in which an axially slidable inner electrode is arranged coaxially in a conical section of a conduit and the counter electrode is formed by three annular partial electrodes which are spaced apart by insulators, which partial electrodes form a wall section of the conduit. The inner electrode is conical and is slidably supported at one end of the flow cell, at which end a lateral connection forms an inlet or outlet opening.

OBJECT OF THE INVENTION

The invention has the object to provide an alternative flow cell, in particular one that is easy to assemble and easy to disassemble. Another object is the provision of an alternative flow cell and of a process feasible therewith for the treatment of liquids by electrical fields which are preferably pulsed.

DESCRIPTION OF THE INVENTION

The invention achieves the object by the features of the claims and in particular provides a flow cell having a tube piece which extends along a longitudinal axis and at the one end of which an inlet opening is arranged and at the other end of which an outlet opening is arranged. The flow cell therefore along its longitudinal axis has an inlet opening and an outlet opening lying opposite. The inlet opening and the outlet opening can therefore be formed by connecting nozzles, wherein the inlet opening and the outlet opening extend in perpendicular to the longitudinal axis.

A first electrode is arranged coaxially in the tube piece. The tube piece is formed by a first tube section and a second tube section and by a second electrode which is arranged between the first tube section and the second tube section, which second electrode is circumferentially closed so that its inner surface forms a part of the tube piece. The arrangement of first and second tube sections and of the second electrode, which is circumferentially closed and arranged between them, is encompassed by a first and a second radial carrier, which are arranged adjacent to the ends of the first tube section and of the second tube section, which ends each lie opposite to the second electrode. The first and the second radial carrier abut against the opposite ends of the first tube section or resp. of the second tube section, each along their cross-sectional surface or resp. along their front face, and are each circumferentially closed. The first and second radial carriers preferably each form a section of the flow cell or resp. of the tube section. The first radial carrier and the second radial carrier are arranged coaxially to the longitudinal axis of the tube piece.

The first electrode is fixed to the first radial carrier and to the second radial carrier, for example each with an opposite end of the first electrode. One of first and second radial carriers, preferably both radial carriers, are electrically conductively connected to the first electrode. Optionally, the first electrode can be connected only to the first and the second radial carriers. The first and the second radial carriers are connected to the first electrode, wherein between the first and second radial carriers the first and the second tube sections and therebetween the second electrode are arranged. The first electrode preferably tensions the first radial carrier and the second radial carrier towards one another, so that the first and the second radial carriers between them press the first and second tube sections and therebetween the second electrode against one another. Further preferably, the first and the second radial carriers and lying between these the first tube section and the second tube section and, arranged between these two tube sections, the second electrode are connected to one another only in that the first radial carrier and the second radial carrier are tensioned towards one another by means of the first electrode, so that e.g. no additional screw connection or clamping connection connects the first and second tube sections, the second electrode and the radial carriers to one another.

The invention preferably relates to a flow cell with a tube piece which extends along a longitudinal axis and at the ends of which an inlet opening and an opposite outlet opening are arranged, with a first electrode which at least sectionally is coaxially arranged in the tube piece and which is coaxially encompassed by a spaced second electrode, wherein the tube piece is formed by a first tube section and by a second tube section and by a circumferentially closed second electrode arranged between the first and second tube sections, wherein a first radial carrier and a second radial carrier are arranged adjacent to the ends of the first tube section and of the second tube section, which ends lie opposite to the second electrode, and the first electrode is fixed to the first and second radial carriers, at least one of which is connected in an electrically conductive manner to the first electrode, and the first and second radial carriers are tensioned towards one another by means of the first electrode.

Preferably, the first tube section is liquid-tight connected to the first radial carrier and to the second electrode, and the second tube section is liquid-tight connected to the second electrode and to the second radial carrier only in that these are pressed against one another by the first and second radial carriers being tensioned against one another by means of the first electrode, preferably with seals arranged in-between each.

This tensioning of the first and second radial carriers against one another with the first and second tube sections arranged between them, between which tube sections the second electrode is arranged, allows for a simple structure and for a simple disassembly and assembly of the flow cell, because e.g. only one or both of the attachments, by which the first electrode is fixed once to the first radial carrier and once to the second radial carrier, is to be disengaged for disassembly or fixed for assembly. Because the inlet opening and outlet opening are arranged along the common longitudinal axis of the first and second tube sections and of the second electrode, wherein the first electrode is also arranged coaxially along the same longitudinal axis, preferably at least one attachment of the first electrode to one of the radial carriers is accessible through the inlet opening or the outlet opening.

The inlet opening or resp. the outlet opening is each spanned open by one of the radial carriers opposite to the adjacent tube section. The inlet opening is preferably formed by a first connecting piece which opposite to the first tube section is connected to the first radial carrier, for example by means of a screw connection or a clamping connection. The outlet opening is preferably spanned open by a second connecting piece which is arranged opposite to the second tube section at the second radial carrier, for example by means of a clamping connection or a screw connection. The first connecting piece and the second connecting piece are preferably of electrically non-conductive material. Further preferred, the first connecting piece opposite the first radial carrier has a connecting nozzle spanning open the inlet opening, and the second connecting piece opposite the second radial carrier has a connecting nozzle spanning open the outlet opening.

The first electrode is preferably fixed with one of its ends at the first radial carrier, and is fixed with its opposite end at the second radial carrier. The first electrode can be attached to each of the radial carriers e.g. by means of a clamping connection or a screw connection.

The first and the second radial carriers each have at least two webs which are arranged in a radial symmetrical manner around the longitudinal axis and to which the first electrode is fixed. Between the webs, the radial carriers have through openings through which liquid can flow.

Preferably, at least one of the radial carriers, further preferably both radial carriers are connected to the first electrode in an electrically conductive manner. At least one of the radial carriers, preferably both radial carriers, have an electrical connection and is connectable to a voltage source. Because the first and the second radial carriers between them encompass the first electrode along the longitudinal axis of the flow cell, preferably at least one radial carrier, more preferably both radial carriers, are electrically connected to a voltage source, further preferably each of the radial carriers is directly connected to the voltage source by means of a separate or a common electrical line.

Generally preferably, the first electrode, the second electrode, the first and the second radial carriers and the first and the second tube sections are formed rotationally symmetrical around a common longitudinal axis.

The second electrode is electrically connected to a terminal of opposite polarity of a voltage source. Therein, one of the electrodes can be connected to the ground terminal of a voltage source and the other electrode to the live terminal of the voltage source. Optionally, e.g. the first electrode is connected to a ground terminal of a voltage source, e.g. to the zero-conducting terminal of a voltage source, and the second electrode to the live terminal of the voltage source.

Preferably, voltage of opposite polarity and same amount can be applied to the first and second electrodes, e.g. one electrode with +15 kV, the other with −15 kV.

Generally preferably, the first and the second radial carriers are each single-pieced of metal, and also the second electrode is preferably single-pieced of metal. The first tube section and the second tube section are preferably each single-pieced of an electrically non-conductive material, or resp. form an insulator between the second electrode and the radial carriers.

Preferably, the first electrode is single-pieced of metal.

The first electrode preferably has a cylindrical outer circumference, wherein further preferably the first electrode in the axial region, over which the second electrode extends at least in part, has a larger outer diameter than in the axial region in which the first electrode extends in the first tube section and/or in the second tube section or in which the first electrode is connected to one of the radial carriers. A larger outer diameter of the first electrode in the region which is encompassed by the second electrode with a spacing leads to a concentration of the electric field between the first and the second electrodes in this region.

Generally, the flow cell has the advantage that the first electrode in a simple manner can be exchanged for a further first electrode. The flow cell is therefore optionally provided in combination with at least one further first electrode. The at least one further first electrode can e.g. have a different outer diameter in its axial region in which it is encompassed by the second electrode. In this manner, the electric field strength between the electrodes can be adjusted by an exchange of the first electrode for one with a differing outer diameter in the area encompassed by the second electrode, e.g. upon a change of the liquid being treated. Because the flow cell allows for a simple disassembly by disengaging the connections between the first electrode and the first and the second radial carriers, the first electrode can be exchanged for a further first electrode. Alternatively, the flow cell can be provided in combination with a further second electrode which has a different inner diameter, for example a smaller inner diameter. This is because the flow cell according to the invention allows for a simple disassembly in a simple manner, namely by disengaging at least one connection of the first electrode to the first and/or second radial carriers, so that the second electrode can be exchanged for a further second electrode which has a different inner diameter. Such a combination can e.g. be the tube piece, which is formed by the first tube section, by the second tube section and by the second electrode arranged between these, with at least two second electrodes, only one of which is attached to the radial carriers and the at least one other is exchangeable for the electrode attached to the radial carriers.

Generally preferably, the radial carriers, the first and the second tube sections and the two electrodes have a circular inner cross section, wherein the inner cross section of the radial carriers is divided by at least two webs.

The inner surfaces of the radial carriers, the inner surfaces of the first and second tube sections, the inner surface of the second electrode and the outer surface of the first electrode are preferably coaxial to one another and rotationally symmetrical.

The first radial carrier and the second radial carrier and/or the second electrode can each have recesses, e.g. on their front faces, into which the first or resp. second tube section engages. The first and the second tube sections can e.g. be cylindrical, so that the recesses of the radial carrier and of the second electrode which face the tube section can be annular, with a carrier surface 20 which runs perpendicularly to the longitudinal axis or at an angle to the longitudinal axis, e.g. conically.

Preferably, a circumferentially closed seal, for example an O-ring, is each arranged between the first tube section and the first radial carrier and the opposite second electrode, and between the second tube section and the second electrode and the second radial carrier opposite thereto.

Figure 1:
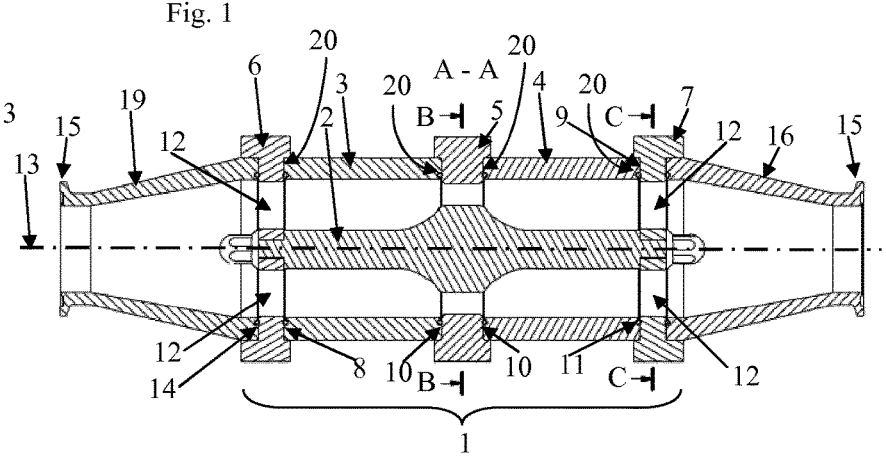

The invention will now be described in more detail with reference to the figures which show a preferred embodiment of the flow cell in FIG. 1 in sectional view in parallel to the longitudinal axis, FIG. 2 in a top view onto the flow cell in the direction of the longitudinal axis, wherein FIG. 1 shows the section A-A of FIG. 2, FIG. 3 the sectional view B-B of FIG. 1 and FIG. 4 the sectional view C-C of FIG. 1.

In the figures, identical reference numerals designate functionally identical elements.

FIG. 1 shows a flow cell, the tube piece 1 of which forms a flow cell with the first electrode 2 contained therein, wherein the tube piece 1 is formed by a first tube section 3 and a second tube section 4 with a second electrode 5 which is circumferentially closed arranged between these. The first tube section 2, the second tube section 4 and the second electrode 5 arranged between these are arranged between a first radial carrier 6 and a second radial carrier 7. The first radial carrier 6 and the second radial carrier 7 between them clamp the first tube section 3, the second tube section 4 and the second electrode 5 arranged between these.

The first and second radial carriers 6, 7 each have at least two radial webs 12 to which the first electrode 2 is attached along the common longitudinal axis 13. The first electrode 2 is each terminally connected to a central opening of the webs 12 by a screw connection. The first electrode 2 loads the webs 12, so that the first radial carrier is loaded against the second radial carrier and the two radial carriers 6, 7 are tensioned towards one another by means of the first electrode 2. By this tensioning, the first tube section 3, the second tube section 4 and the second electrode 5 arranged between these are fixed between the first and second radial carriers 6, 7.

The first radial carrier 6 has an annular recess 8 facing the adjacent first tube section 3, into which annular recess 8 a terminal section of the first tube section 3 engages. Correspondingly, the second radial carrier 7 has an annular recess 9 into which a terminal section of the second tube section 4 engages. The second electrode 5 on opposite sides, which are preferably its front faces, has annular recesses 10 into which terminal sections each of the first tube section 3 or resp. of the second tube section 4 engage.

Seals 11, for example O-rings, are each arranged between the tube sections 3, 4 and each of the oppositely arranged first radial carrier 6, second electrode 5, and second radial carrier 7.

Opposite the first tube section 3, a first connecting piece 19 is connected to the first radial carrier 6, for example screwed into the recess 14 of the first radial carrier 6 opposite its annular recess 8 by means of a thread. The first connecting piece 19 has a nozzle 15 at its end. At the opposite end, the flow cell has a second connecting piece 16 which is arranged in a recess 14, which is arranged at the second radial carrier 7 opposite of its annular recess 9 or resp. opposite the second tube section 4. The second connecting piece 16 has e.g. an outlet opening.

FIG. 2 shows that preferably the first electrode 2 can be connected to at least three evenly radially arranged webs 12 of the first radial carrier 6 and of the second radial carrier 7.

Figure 3:
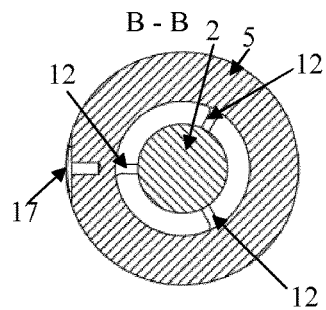

FIG. 3 shows that the first electrode 2 has a larger outer diameter in the axial area in which it is circumferentially encompassed by the second electrode 5 than in an axial section in which the first electrode 2 is encompassed by the first or second tube sections 3, 4, or in which it is attached to the second radial carrier 7 or resp. to the first radial carrier 6.

Furthermore, FIG. 3 shows that the second electrode 5 as an electrical terminal 17 can e.g. have a connection surface with a thread cut into the second electrode 5.

The figures show that the first electrode 2 according to the preferred embodiment is formed single-pieced and that the second electrode 5 is formed single-pieced.

Figure 4:
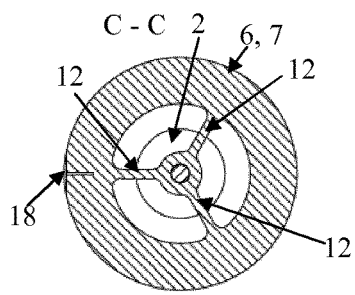

FIG. 4 further shows that at least one of the radial carriers 6, 7 has a further electrical terminal 18, e.g. a connection surface with a thread cut into the radial carrier 6, 7.

REFERENCE NUMBERS 1 tube piece
2 first electrode
3 first tube section
4 second tube section
5 second electrode
6 first radial carrier
7 second radial carrier
8 annular recess
9 annular recess
10 annular recess
11 seal
12 web
13 longitudinal axis
14 recess
15 nozzle
16 second connecting piece
17 electrical terminal
18 electrical terminal
19 first connecting piece
20 carrier surface

The invention claimed is:

1. A flow cell, comprising:
a tube piece extending along a longitudinal axis and comprising a first tube section and a second tube section,
an inlet opening and an opposite outlet opening at respective outer ends of the first tube section and the second tube section,
a first electrode which at least in part is arranged coaxially in the tube piece and which is coaxially encompassed by a circumferentially closed second electrode arranged between the first and second tube sections, and
a first radial carrier and a second radial carrier arranged adjacent the inlet opening and the outlet opening, wherein
the first electrode is fixed to the first and second radial carriers, and at least one of the first and second radial carriers is in electrically conductive contact to the first electrode.

2. The flow cell according to claim 1, wherein the first electrode extends linearly between the first and the second radial carriers along the longitudinal axis, and in an axial region in which it is encompassed by the second electrode with a spacing, the first electrode has a larger outer diameter than in axial regions that are encompassed by the first and second tube sections.

3. The flow cell according to claim 1, wherein the first and second radial carriers are tensioned towards one another by the first electrode.

4. The flow cell according to claim 1, wherein the first tube section and the second tube section are clamped against the second electrode and clamped between the first radial carrier and the second radial carrier by tension of the first electrode that tensions the first radial carrier towards the second radial carrier.

5. The flow cell according to claim 1, wherein the first radial carrier comprises at least two radially symmetrical webs and the second radial carrier comprises at least two radially symmetrical webs the first electrode is fixed the radially symmetrical webs of the first radial carrier and the second radial carrier.

6. The flow cell according to claim 1, wherein each of the first tube section, the second tube section, the second electrode and the first and second radial carriers comprise circular inner cross sections.

7. The flow cell according to claim 1, wherein the first tube section, the second tube section, the second electrode, and the first and second radial carriers have a same inner diameter.

8. The flow cell according to claim 1, comprising a first connecting piece of an insulator is-connected to the first radial carrier, and a second connecting piece of an insulator is-connected to the second radial carrier.

9. The flow cell according to claim 1, wherein the second electrode and the first and the second radial carriers consist of metal and the first and the second tube sections consist of insulator.

10. The flow cell according to claim 1, wherein the first tube section abuts against the first radial carrier and against the second electrode in a plane, arched or cone-shaped annular contact surface, and the second tube section abuts against the second radial carrier and against the second electrode in a plane, arched or cone-shaped annular contact surface.

11. The flow cell according to claim 1, wherein the first tube section liquid-tight abuts against the first radial carrier and against the second electrode, and the second tube section liquid-tight abuts against the second radial carrier and against the second electrode, and the first radial carrier and the second radial carrier are tensioned toward each other by the first electrode.

12. The flow cell according to claim 1, wherein the second electrode and the at least one of the first and second radial carriers is connected to a voltage source configured to apply voltage of the same amount and opposite polarity to the first and second electrodes.

13. A process for treatment of a liquid by electrical fields, wherein the flow cell according to claim 1 is provided and the liquid is moved through the flow cell, and voltages of opposite polarity are applied between the first electrode and the second electrode.

14. The process according to claim 13, in which upon a change of the liquid against a different one, the first electrode is exchanged for a further first electrode having a different outer diameter in the axial region in which it is encompassed by the second electrode, and/or the second electrode is exchanged for a further second electrode having a different inner diameter in the axial region in which it encompasses the first electrode.

* * * * *